(12) United States Patent
Stewart

(10) Patent No.: US 7,344,647 B2
(45) Date of Patent: Mar. 18, 2008

(54) PROCESS FOR TREATING WASTE WATER TO REMOVE CONTAMINANTS

(75) Inventor: Timothy L. Stewart, Cartersville, GA (US)

(73) Assignee: Stewart Water Solutions, Ltd., Cartersville, GA (US)

( * ) Notice: Subject to any disclaimer, the term of this patent is extended or adjusted under 35 U.S.C. 154(b) by 180 days.

(21) Appl. No.: 10/801,771

(22) Filed: Mar. 16, 2004

(65) Prior Publication Data

US 2004/0173538 A1 Sep. 9, 2004

Related U.S. Application Data

(63) Continuation-in-part of application No. 10/200,047, filed on Jul. 18, 2002, now abandoned.

(51) Int. Cl.
*C02F 1/24* (2006.01)
*C02F 1/56* (2006.01)

(52) U.S. Cl. .............. 210/703; 210/705; 210/706; 210/725; 210/727; 210/735

(58) Field of Classification Search .............. 210/703, 210/705, 725, 735, 727, 704, 706
See application file for complete search history.

(56) References Cited

U.S. PATENT DOCUMENTS

| | | |
|---|---|---|
| 3,147,217 A | 9/1964 | Halton |
| 3,314,880 A | 4/1967 | Rubin |
| 3,617,539 A | 11/1971 | Grutsch et al. |
| 3,707,464 A | 12/1972 | Burns et al. |
| 3,959,131 A * | 5/1976 | Ramirez et al. ............. 210/707 |
| 3,969,245 A * | 7/1976 | Ramirez ..................... 210/707 |
| 3,975,269 A * | 8/1976 | Ramirez ..................... 210/707 |
| 4,031,006 A * | 6/1977 | Ramirez et al. ............. 210/707 |
| 4,108,768 A | 8/1978 | Sebelik et al. |
| 4,179,369 A | 12/1979 | Bradley et al. |
| 4,338,192 A | 7/1982 | Krasnoff et al. |
| 4,737,272 A | 4/1988 | Szatkowski et al. |
| 4,738,750 A | 4/1988 | Ackel |
| 4,784,764 A | 11/1988 | Klienschnittger et al. |
| 4,981,599 A | 1/1991 | Stewart, Jr. |
| 5,275,732 A | 1/1994 | Wang et al. |
| 5,308,499 A * | 5/1994 | Dixon et al. ................ 210/705 |
| 5,364,529 A | 11/1994 | Morin et al. |
| 5,423,981 A | 6/1995 | Krieger |
| 5,540,836 A | 7/1996 | Coyne |
| 5,543,043 A | 8/1996 | Bates et al. |
| 5,658,462 A | 8/1997 | Hopkins et al. |
| 5,766,484 A * | 6/1998 | Petit et al. .................. 210/703 |
| 2003/0141254 A1* | 7/2003 | Stewart ...................... 210/705 |
| 2004/0173538 A1* | 9/2004 | Stewart ...................... 210/705 |

FOREIGN PATENT DOCUMENTS

WO   WO 91/08175   6/1991

* cited by examiner

*Primary Examiner*—Thomas M. Lithgow
(74) *Attorney, Agent, or Firm*—Baker, Donelson, Bearman, Caldwell & Berkowitz, PC

(57) ABSTRACT

Recycled waste water is treated to remove contaminants and produce a sludge cake with a high percentage of solids and to produce a treated recycled waste water that can be discharged into a municipal sewer system.

26 Claims, 3 Drawing Sheets

PROCESS FOR TREATING WASTE WATER TO REMOVE CONTAMINANTS

This application is a continuation-in-part of, and claims the benefit of, U.S. patent application Ser. No. 10/200,047, filed Jul. 18, 2002 now abandoned.

TECHNICAL FIELD

The present invention relates to a process for treating waste water. In a more specific aspect, this invention relates to a process for treating waste water to remove contaminants from the waste water.

As used in this application, the term "contaminants" generally refers to the materials which must either be removed from waste water or at least removed in a sufficient quantity to meet effluent discharge requirements before the treated waste water (i.e., the effluent) can be discharged into a municipal or other sewer system. Examples of such materials are human waste, oil, grease and organics which require bio/chemical oxidation, grit, sand, ammonia, nitrogen, etc.

BACKGROUND OF THE INVENTION

Most cities and counties have enacted requirements for industries which discharge water into municipal sewer systems. These municipalities generally require the waste water to meet certain requirements before being discharged into the sewer systems, and these requirements usually relate to the level of contaminants which interfere with the efficient operation of the municipal waste water treatment facility.

Waste water which contains materials having a high biological oxygen demand, total suspended solids and ammonia increase the treatment cost to the city or county. For purposes of this invention, the term "biological oxygen demand" ("BOD") refers to the quantity of oxygen utilized in the bio/chemical oxidation of organic matter; and the term "total suspended solids" ("TSS") refers to the total suspended solids which either float on the surface of or are suspended in waste water and which may be removed by filtering, skimming, etc.

In some instances, a surcharge may be levied on an industrial plant that produces waste water which does not meet the standards as established by the municipality.

A city or county also has the authority to revoke an industrial plant's waste water discharge permit if that plant continues to discharge waste water which does not meet the requirements set by that city or county. Therefore, an industrial plant must effectively treat its waste water to reduce the level of contaminants to comply with such municipal requirements.

An effective waste water treatment process should cause the solid organic and inorganic matter in the waste water to flocculate and form a sludge cake. This sludge cake accumulates to a certain thickness, is then separated from the liquid component of the waste water and then typically is sent either for disposal or to a rendering plant for further processing.

A common method of treating waste water is the dissolved air flotation method ("DAF") which injects dissolved air into the waste water, causing the solids to rise to the top. However, the DAF method tends to produce a sludge cake with a low percentage of solids.

Another method of treating waste water is to use a clarifying or settling tank with a filter at the bottom. The waste water is chemically treated within the tank, and the solids sink to the bottom of the tank. The liquid component of the waste water is directed out of the tank, and a wet cake is left on the filter. However, this method also tends to produce a sludge cake with a low percentage of solids.

With the DAF method or the settling tank method, a belt press can be used to produce a sludge cake with a higher solids content. However, this step requires additional equipment, expense and time.

Another method of treating waste water from an industrial plant is disclosed in Stewart U.S. Pat. No. 4,981,599 (1991). This process results in the formation of a sludge cake on top of the waste water. The sludge cake is removed, and the treated waste water is discharged into the sewer system.

However, the sludge cake (also referred to as the float material) produced by the prior treatment processes is not ideally suited for subsequent treatment at a rendering plant because (1) the water content of the float material tends to be higher than desired and (2) the float material is comprised of fatty and protein components which desirably should be separated from the water component.

Hopkins et al. U.S. Pat. No. 5,658,462 (1997) discloses a process which results in the recovery of proteins, fatty and water components from a float material produced by a waste water treatment system. The protein and fatty components can be further processed for inclusion in various products, and the water component can also be further processed before discharge into a sewer system.

Therefore, there is a need for a process that effectively (a) treats industrial waste water to meet the requirements as set by a city or county so that such treated waste water can be discharged into a municipal sewer system and (b) produces a sludge cake with a high percentage of solids.

SUMMARY OF THE INVENTION

The present invention provides a process for treating waste water to produce a drier sludge cake (i.e., a sludge cake with a high percentage of solids) and waste water that can be discharged into a municipal sewer system prior to further treatment in a municipal waste water treatment facility.

Although the present invention is believed to have utility for treating all types of waste water, the present invention is especially useful in treating industrial waste water from a food processing plant.

Briefly described, the process of the present invention treats recycled waste water with a coagulant and with injected non-dissolved air (i.e., air molecules), mixes the treated recycled waste water with untreated raw waste water, adds a flocculating agent to the mixture of treated and untreated waste water and then moves the waste water mixture to an "entrapped air flotation" unit (also referred to as an "EAF" unit). During residence in the EAF unit, a sludge cake is formed and removed, a first portion of the treated waste water is discharged into a municipal sewer system and a second portion of the treated waste water is recycled through the process of this invention.

Optionally, depending on the waste water to be treated, a pH adjusting material and/or a coagulant is added to the recycled waste water.

Accordingly, an object of this invention is to provide a process for treating waste water.

Another object of this invention is to provide a process for treating waste water before being discharged into a municipal sewer system.

Another object of this invention is to provide a process for removing contaminants from waste water.

Another object of this invention is to provide a process for treating waste water to meet applicable requirements set by a municipality for a municipal sewer system.

Still another object of this invention is to provide a process for treating waste water to cause the flocculation of contaminants in the waste water to form a sludge cake which can then be removed.

Still another object of this invention is to provide a process for treating waste water to produce a sludge cake having a high percentage of solids.

Still another object of this invention is to provide a process for treating waste water in which a portion of the treated waste water is recycled through the process.

These and other objects, features and advantages of this invention will become apparent from the following description.

DETAILED DESCRIPTION OF THE INVENTION

Figure 1:
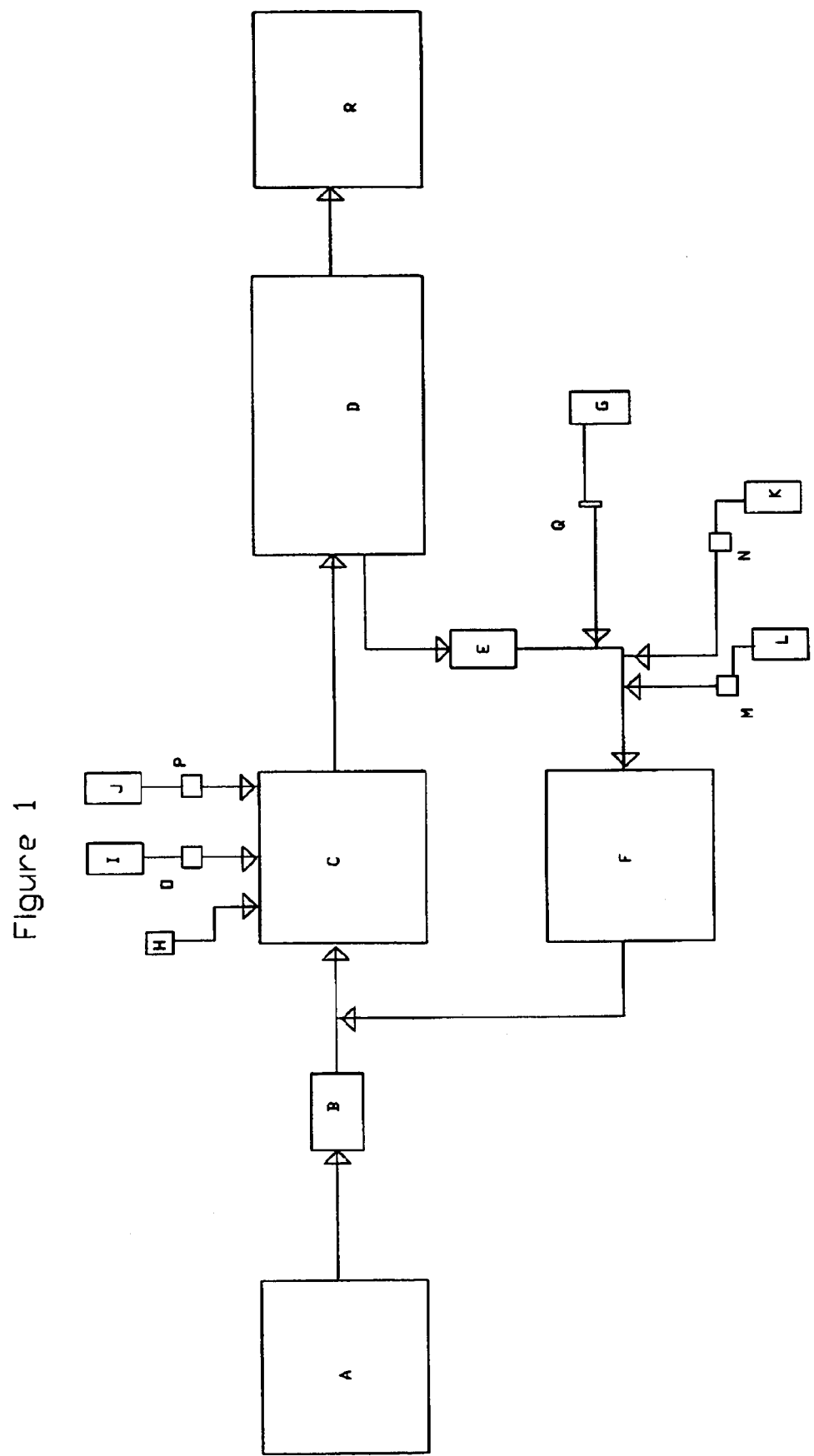
FIG. 1 is a schematic representation, with directional arrows, of a waste water treatment process according to the present invention, which uses a transfer pump and a recycle pump.

The present invention provides a process for treating waste water to remove contaminants from the waste water, wherein the process comprises: treating recycled waste water with a coagulant and with non-dissolved air which is injected into the recycled waste water; mixing the treated recycled waste water with untreated raw waste water; adding a flocculating agent to the mixture of treated and untreated waste water to flocculate contaminants in the waste water, whereby the non-dissolved air is entrapped within the flocculated contaminants; moving the waste water mixture to a unit in which the flocculated contaminants rise to an upper area of the unit; removing the flocculated contaminants from the upper area of the unit; removing a first portion of the waste water mixture from a lower portion of the unit for discharge into a municipal sewer system; and recycling a second portion of the waste water mixture through the process.

As used in this application, the following terms shall have the indicated definitions:

"waste water mixture"—refers to the mixture of (a) recycled waste water which has been treated with a coagulant and with injected non-dissolved air and optionally with a pH adjusting material and (b) untreated incoming raw waste water.

"EAF unit" or "unit" or "separation vessel"—refers to the container (i.e, vessel, tank, etc.) in which the flocculated contaminants are removed.

"mixing chamber"—refers to the container (i.e., chamber, series of tubes, etc.) in which the flocculating agent is added to the waste water mixture.

"reactor"—refers to the container (i.e., vessel, tank, series of tubes, etc.) in which the recycled waste water is treated with a coagulant and with injected non-dissolved air and optionally with a pH adjusting agent prior to being mixed with untreated incoming raw waste water.

"non-dissolved air"—refers to the air (i.e., air molecules) which is injected into the recycled waste water and which is not dissolved in waste water (either the recycled waste water or the waste water mixture) being treated.

An essential step in the process of this invention is the recycling of a portion (sometimes referred to as the "second" portion) of the waste water mixture. The combination of recycling and non-dissolved air provides enhanced results as compared to a process in which waste water is not recycled and dissolved air is used. In the process of this invention, recycling of a portion of the waste water mixture can be accomplished through the use of low pressure pumps, by the use of gravity flow from the unit or by other suitable means.

Another essential step in the process of this invention is the use of non-dissolved air, which enhances the floatability of the contaminants. This process uses non-dissolved air in an amount which is generally substantially less than the amount required in other flotation waste water treatment processes, such as the DAF method.

As stated earlier in this application, an optional step in the process of this invention is the use of a pH adjusting material. The use of this material will depend upon the pH of the waste water mixture. In some instances, the pH of the waste water mixture does not need to be adjusted. In other instances, the pH of the waste water mixture will need to be raised or lowered to obtain a pH within the range at which the flocculant is effective for this process. Therefore, when necessary, this invention contemplates the use of various materials to adjust the pH of the waste water mixture to a range of generally about 2.5 to about 10.0. The specific pH will depend upon the waste water mixture being treated and the flocculant being used.

In this process, the sequence by which the recycled waste water is treated with a coagulant, non-dissolved air, a flocculating agent and a pH adjusting agent (if used) is not critical, if all components used in the process are present in the waste water mixture in the reactor. A preferred sequence is to treat the recycled waste water with a coagulant and non-dissolved air, then a pH adjusting material (if used), followed by addition of a flocculating agent to the waste water mixture.

When the identity (or source) and pH of the waste water mixture are determined, the process operator is able to select the desired pH for that waste water mixture to be treated according to the process of this invention. For example, the pH generally needs to be raised if the waste water mixture contains metals, but the pH generally needs to be lowered if the waste water mixture is from a food processing plant. As stated earlier in this application, principal objective of the pH adjusting step (if used) is to bring the waste water mixture to a pH within the range at which the flocculating agent (described below) is most effective in the process of this invention. The pH adjusting material is preferably added to the recycled waste water at a point in this process which ensures adequate treatment before the flocculating agent is added.

Examples of materials useful in this invention to adjust pH are tannins; lignins; hydroxide compounds such as sodium hydroxide, potassium hydroxide and calcium hydroxide; metal-containing compounds such as ferric chloride, ferric sulfate, aluminum chloride and aluminum sulfate; and acidic compounds such as sulfuric acid, nitric acid and hydrochloric acid. Certain combinations of 2 or more of these materials can be used. This process does not require a specific amount of the pH adjusting material, because the amount introduced is dependent on the pH of the waste water mixture. Additionally, the pH adjusting material may also combine with solid waste matter and thereby enhance the flocculation described below.

As stated above, a metal-containing compound may be used as a pH adjusting material in the process of this invention. If a metal-containing compound is used, a hydroxide may be introduced into the process after the metal-containing compound but before the addition of the flocculating agent. The hydroxide may be added to adjust the pH of the waste water mixture to correspond to the range at which the flocculating agent is most effective. The pH of the waste water mixture may be monitored before the introduction of the flocculating agent. If the pH is within the effective range of the flocculating agent, the addition of a large amount of hydroxide is not necessary. The preferred hydroxides are sodium, potassium and calcium hydroxides, with sodium hydroxide being especially preferred.

In the situation where an iron-containing compound is used as the pH adjusting material, the addition of a hydroxide will also ensure that sufficient iron has entered the recycled waste water for further processing according to this invention.

The flocculating agent is used to bind inorganic and organic mater in the waste water mixture, thereby producing a removable sludge cake with a high percentage of solids (i.e., about 15%-50%, and preferably at least about 25%). Although various flocculating agents may be used, preferred agents for this invention are tannins, lignins, cationic polymers and anionic polymers. Especially preferred flocculating agents are the polyacrylamides. More than one flocculating agent may be used in the process of this invention.

The waste water being treated by this invention is preferably in constant motion, as this invention is most effective in a continuous waste water treatment process.

For the process of this invention to be most effective in removing contaminants, the EAF unit is preferably at least substantially filled with treated and/or untreated waste water at all times.

In a preferred embodiment of this invention, the EAF unit is filled with water prior to the start of this process. This water may be (a) water which has been previously treated by this process (such as from the previous night before the process was shut down), (b) water that has been treated by this process and is being recycled, (c) clean water with or without raw waste water or (d) raw waste water. Except for any initial incoming raw waste water, the incoming raw waste water must be treated, prior to being moved or directed to the EAF unit, by being mixed with recycled waste water which has been treated according to the process of this invention.

Preferably in the process of this invention, the pH adjusting material (if used), coagulant, flocculating agent and injected non-dissolved air are mixed with the recycled waste water prior to the time at which the recycled water re-enters the EAF unit. These mixing steps can occur in various ways, such as in a series of tubes, lines and other vessels, tanks and containers. Thus, the recycled waste water is treated by the process of this invention before being mixed with the raw waste water.

In another embodiment of this invention, sulfuric acid is used as the pH adjusting material to lower the pH of the waste water to a point at which red blood cells start to precipitate, a coagulant is then added and the waste water is then treated with injected non-dissolved air before being moved to the mixing chamber. Again, a portion of the treated waste water is recycled through the process. This embodiment is sometimes referred as acidulation.

In this invention, a principal advantage over the prior DAF method is that the air used in this process is not dissolved in either the raw waste water or the recycled waste water.

In still another embodiment of this invention, a coagulant is added to the recycled waste water. The use of coagulants in this manner will assist and promote the binding of inorganic and organic matter in the recycled waste water by forming small flocs or "pin flocs" in the reactor.

Examples of coagulants useful in this invention are tannins; lignins; metal-containing compounds such as ferric chloride, ferric sulfate, aluminum chloride and aluminum sulfate; acidic compounds such as sulfuric acid, nitric acid and hydrochloric acid; amine homopolymers and copolymers such as diallyldimethyl ammonium chloride; dimethyl amine; polymeric tannins; and epichlorohydrin. A combination of 2 or more of these coagulants can be used. (For example, the use of tannin and a second coagulant improves the removal of nitrogen from the treated waste water.) This embodiment does not require a specific amount of the coagulant, because the amount introduced is dependent on the characteristics of the raw waste water. The coagulant also combines with the solid waste matter and thereby enhances the flocculation described above.

Referring now to the drawings, in which like letters represent like elements, FIG. 1 shows a preferred embodiment of this invention in which a raw waste water stream from source A (e.g., a lift station, equalization basin or flow equalization basin) is moved by transfer pump B and mixed with recycled waste water from reactor F. The recycled waste water from reactor F has been treated according to the process of this invention with injected non-dissolved air from air system G through air flow valve Q, a coagulant from tank K through feed pump N and a pH adjusting material from tank L through feed pump M in reactor F. The waste water mixture is moved by transfer pump B to mixing chamber C. The pH of the waste water mixture is monitored by pH controller H, and any necessary pH adjustments are made from tank L through feed pump M. Additionally, a flocculant is added to the waste water mixture from tank I through feed pump O and/or from tank J through feed pump P. In the mixing chamber C, the contaminants are flocculated by action of the flocculant(s), coagulant, non-dissolved air and pH adjusting material.

The waste water mixture is then moved to separation vessel D where the flocculated contaminants float to the top and form a sludge cake having a solids content from about 25 to about 45 percent. The sludge cake is removed (such as by skimming), and a first portion of the treated waste water is discharged into, for example, a municipal sewer system. The remaining or second portion of the treated waste water is then recycled through the process of this invention.

Figure 2:
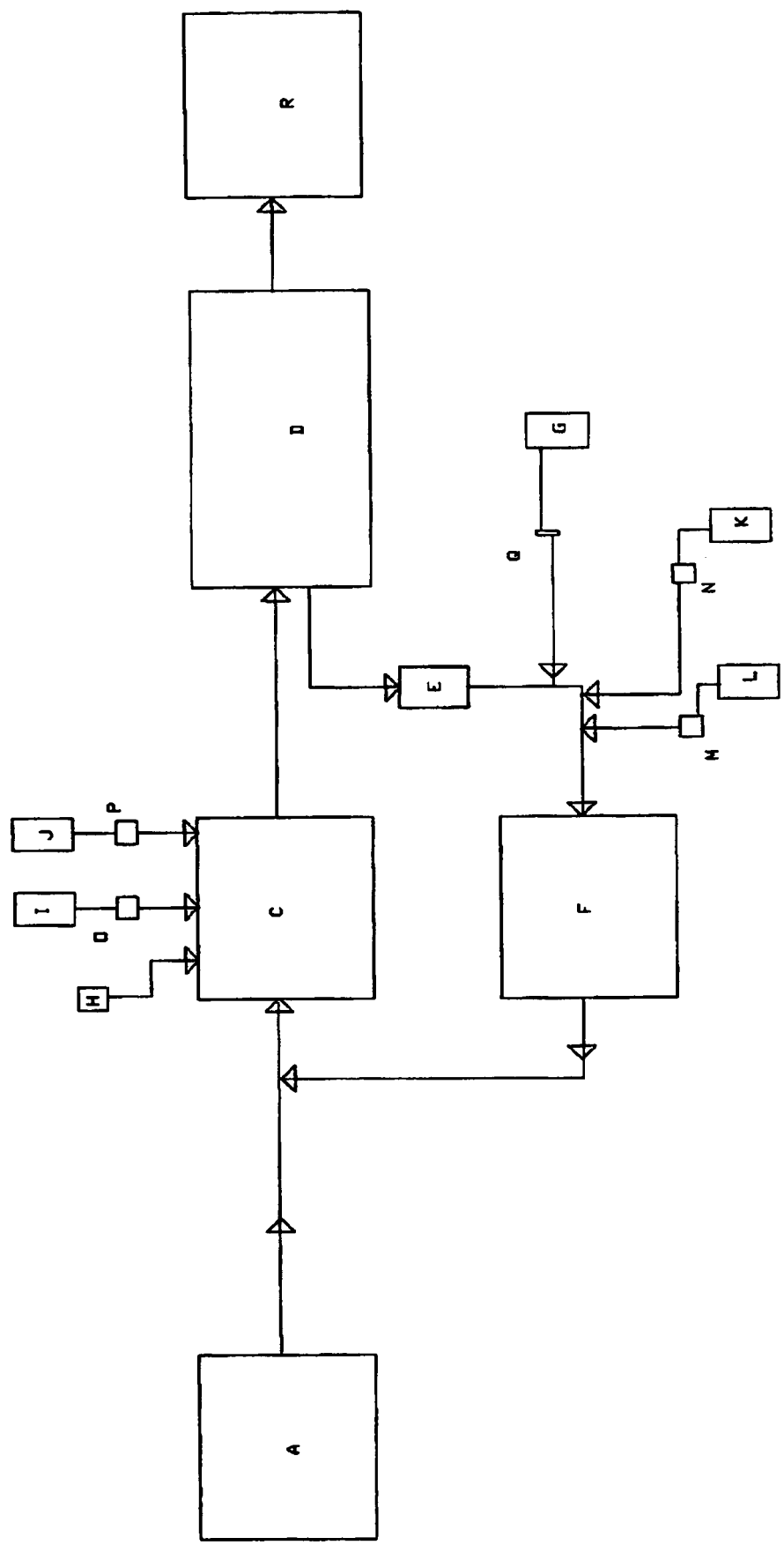
FIG. 2 is a schematic representation, with directional arrows, of a waste water treatment process according to the present invention, which uses gravity flow and a recycle pump.

Another embodiment of this invention is shown in FIG. 2, which is similar to FIG. 1. However, in the process of FIG. 2, a raw waste water stream is moved by gravity from source A, and a recycle pump E is used to recycle waste water from unit D.

Figure 3:
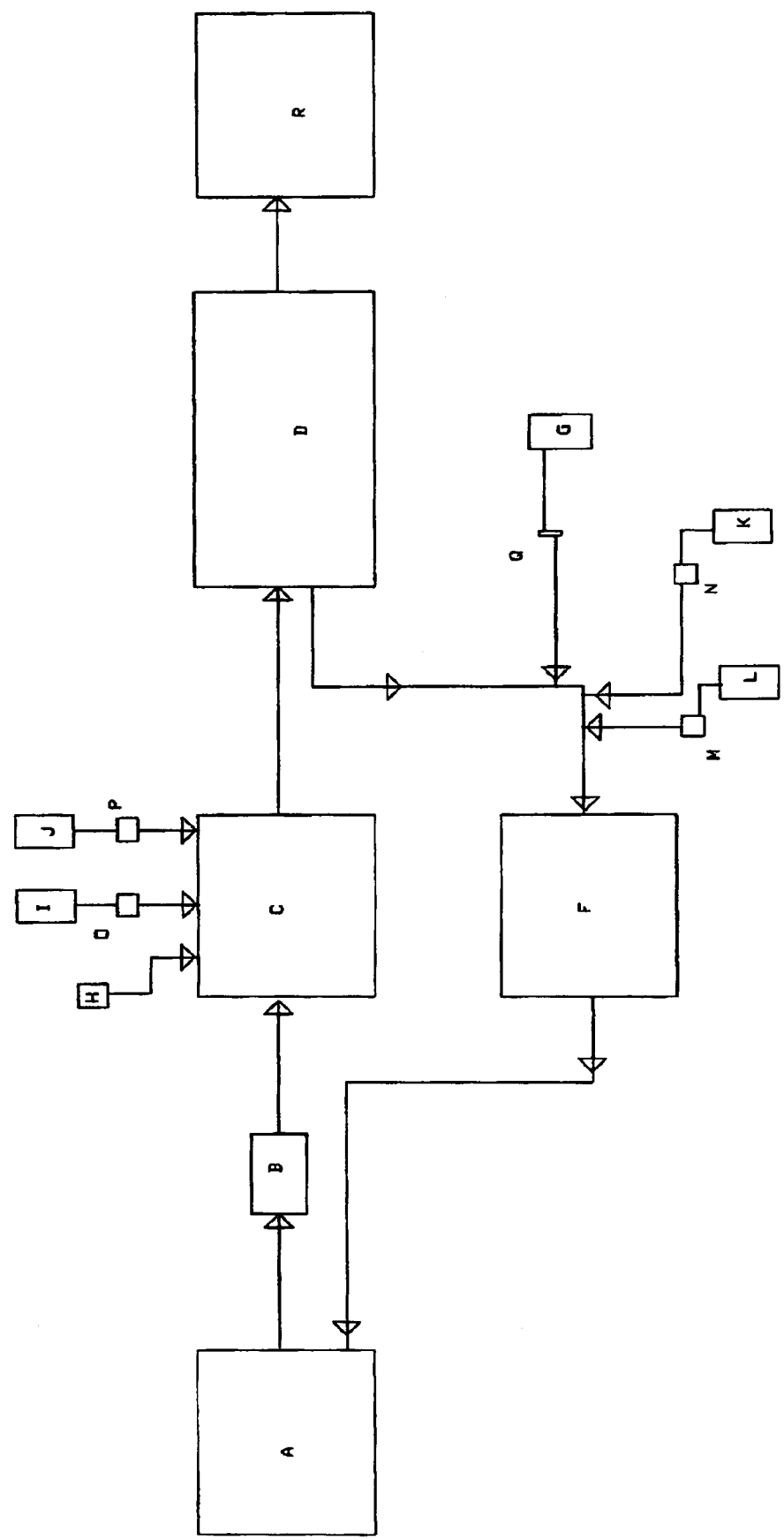
FIG. 3 is a schematic representation, with directional arrows, of a waste water treatment process according to the present invention, which uses a transfer pump and gravity flow.

Another embodiment of this invention is shown in FIG. 3, which is similar to FIG. 1. However, in the process of FIG. 3, a raw waste water stream is moved by transfer pump B, and the recycled waste water is moved by gravity flow from separation vessel D.

The use of injected non-dissolved air in the process of this invention is significantly different from the use of air in other flotation processes, such as a dissolved air flotation process. In the first instance, the air used in this process is not pressurized to the point at which air can be dissolved. Second, the recycle pump E operates on the volume of waste water being recycled, not on the pressure which would be required to dissolve the air. Third, the preferred location for the recycle pump E is on the influent side of the separation vessel D, not on the effluent side of the separation vessel as would be in a dissolved air flotation process. Use of the influent side allows the process of this invention to achieve a hydraulic loading on the separation vessel D which is greater than that achieved in a dissolved air flotation process.

During the time the recycled waste water is in the reactor F, several reactions are occurring. First, if a pH adjusting material is used, soluble BOD components (such as sugars, vinegar, marination components and blood) are oxidized; other waste water treatment processes may not be able to achieve such oxidation. Second, as the non-dissolved air molecules are injected into the recycled water, they begin to attach to the coagulant. During this time, an initial pin floc is formed in the reactor F in which the air molecules are entrapped within the body of the pin floc. In other words, the air molecules do not attach to the outside of the pin floc. In the mixing chamber, the flocculant drives the pin flocs to bind together into a larger floc.

In the mixing chamber C, a flocculant is added to bind the pin floc into a larger floc. Afterwards, in the separation vessel D, the floc (i.e., the flocculated contaminants) floats to an upper area in the form of a sludge cake which is removed. A first portion of the treated waste water is then discharged to a municipal treatment system, a biological plant or to a land application. The remaining or second portion of the treated waste water is taken from the influent side of separation vessel D and moved by recycle pump E or gravity to be recycled through the process of this invention.

This invention has been described in detail with particular reference to certain embodiments, but variations and modifications can be made without departing from the spirit and scope of the invention as defined in the following claims.

What is claimed is:

1. A process for treating waste water to remove contaminants from the waste water, wherein the process includes providing a separation unit for removal of contaminants from the waste water, and wherein the process further comprises:
    A. providing a recycle stream of recycled waste water from the influent end of the separation unit and treating the recycled waste water with a coagulant and injecting non-dissolved air into the recycled waste water, wherein the waste water is recycled by a pump which operates at a pressure below the pressure required to dissolve the air;
    B. mixing the treated recycled waste water with an incoming flow of untreated raw waste water;
    C. adding a flocculating agent to the mixture of treated and untreated waste water to flocculate contaminants in the waste water mixture, whereby the non-dissolved air is entrapped within the flocculated contaminants;
    D. moving the waste water mixture to the separation unit whereby the flocculated contaminants rise to an upper area of the unit;
    E. removing the flocculated contaminants from the upper area of the unit;
    F. removing a first portion of the waste water mixture from a lower portion of the unit; and
    G. recycling a second portion of the waste water mixture through the process as the recycle stream of recycled waste water from the influent end of the separation unit.

2. A process as defined by claim 1 wherein, prior to addition of the flocculating agent, the recycled waste water is treated with a pH adjusting material to adjust the pH of the recycled waste water.

3. A process as defined by claim 2 wherein the pH adjusting material includes a tannin, lignin, hydroxide, metal-containing compound, acidic compound or a mixture of such materials.

4. A process as defined by claim 3 wherein the pH adjusting material includes a tannin, lignin, ferric chloride, ferric sulfate, aluminum chloride, aluminum sulfate or a mixture of such materials.

5. A process as defined by claim 3 wherein the pH adjusting material includes sulfuric acid, hydrochloric acid, nitric acid or a mixture of such materials.

6. A process as defined by claim 3 wherein the pH adjusting material includes sodium hydroxide, potassium hydroxide, calcium hydroxide or a mixture of such materials.

7. A process as defined by claim 1 wherein the flocculating agent includes a tannin, lignin, cationic polymer, anionic polymer or a mixture of such agents.

8. A process as defined by claim 7 wherein the flocculating agent includes a cationic polymer, an anionic polymer or a mixture of such polymers.

9. A process as defined by claim 7 wherein the flocculating agent includes a polyacrylamide.

10. A process as defined by claim 7 wherein the flocculating agent includes a polyamine.

11. A process as defined by claim 1 wherein the air is entrapped within the flocculated contaminants.

12. A process as defined by claim 1 wherein the second portion of the waste water mixture is recycled by a low pressure pump.

13. A process as defined by claim 1 wherein the second portion of the waste water mixture is recycled by gravity flow.

14. A process as defined by claim 1 wherein molecules of the non-dissolved air attach to the coagulant, and an initial pin floc is formed in which the air molecules are entrapped within the pin floc.

15. A process as defined by claim 1 wherein the air is not pressurized to a point at which air can be dissolved.

16. A process for treating waste water to remove contaminants from the waste water, wherein the process includes providing a separation unit for removal of contaminants from the waste water, and wherein the process comprises:
    A. providing a recycle stream of recycled waste water from the influent end of the separation unit and treating the recycled waste water with a coagulant and injecting non-dissolved air into the recycled waste water, wherein the waste water is recycled by a pump which operates at a pressure below the pressure required to dissolve the air;
    B. treating the recycled waste water with a material to adjust the pH of the recycled waste water;
    C. mixing the treated recycled waste water with an incoming flow of untreated raw waste water thereby forming a waste water mixture;
    D. adding a flocculating agent to the mixture of treated and untreated waste water to flocculate contaminants in the waste water mixture, whereby the non-dissolved air is entrapped within the flocculated contaminants;

E. moving the waste water mixture to the separation unit in which the flocculated contaminants rise to an upper area of the unit;
F. removing the flocculated contaminants from the upper area of the unit;
G. removing a first portion of the waste water mixture from a lower portion of the unit;
H. recycling a second portion of the waste water mixture through the process as the recycle stream of recycled waste water from the influent end of the separation unit; and
I. adding a coagulant to the second portion of the waste water mixture after the second portion is treated with a material to adjust the pH of the recycled waste water.

17. A process as defined by claim 16 wherein the coagulant is a tannin, lignin, hydroxide, metal-containing compound, acidic compound or a mixture of such compounds.

18. A process as defined by claim 17 wherein the coagulant is ferric chloride, ferric sulfate, aluminum chloride, aluminum sulfate or a mixture of such materials.

19. A process as defined by claim 17 wherein the coagulant is sulfuric acid, hydrochloric acid, nitric acid or a mixture of such materials.

20. A process as defined by claim 17 wherein the coagulant is sodium hydroxide, potassium hydroxide, calcium hydroxide or a mixture of such materials.

21. A process as defined by claim 16 wherein the second portion of the waste water mixture is recycled by a low pressure pump.

22. A process as defined by claim 16 wherein the second portion of the waste water mixture is recycled by gravity flow.

23. A process as defined by claim 16 wherein the second portion of the waste water mixture is recycled by a low pressure pump.

24. A process as defined by claim 16 wherein the second portion of the waste water mixture is recycled by gravity flow.

25. A process as defined by claim 16 wherein molecules of the non-dissolved air attach to the coagulant, and an initial pin floc is formed in which the air molecules are entrapped within the pin floc.

26. A process as defined by claim 16 wherein the air is not pressurized to a point at which air can be dissolved.

* * * * *